William E. Banta, Assignor to Wm. E. Banta & Jno. P. Allen.

Improvement in Lever-staffs for Watches, Clocks, &c.

117242    PATENTED JUL 25 1871

Witnesses.
Chas C. Wilson
Edmund Masson

William E. Banta.
By atty A. B. Stoughton.

UNITED STATES PATENT OFFICE.

WILLIAM E. BANTA, OF SPRINGFIELD, OHIO.

IMPROVEMENT IN LEVER-STAFFS FOR WATCHES, &c.

Specification forming part of Letters Patent No. 117,242, dated July 25, 1871.

*To all whom it may concern:*

Be it known that I, WILLIAM E. BANTA, of Springfield, in the county of Clark and State of Ohio, have invented certain new and useful Improvements in Lever-Staffs for Watches, Clocks, and Chronometers; and I do hereby declare the the following to be a full, clear, and exact description of the same, reference being had to the accompanying drawing making a part of this specification, in which—

Figure 1:
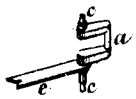
Figure 2:
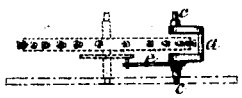

Figure 1 represents, in perspective, the lever-staff, in question, with a lever attached for the sake of illustration, any other form of lever being capable of connection with the staff. Fig. 2 represents an elevation of the staff and lever, and, in dotted lines, the balance-wheel with which such lever-staffs operate, for the sake of illustration.

My invention consists in the arrangement of a long lever-staff with a bend or bow in it, in relation to the balance-wheel and the connecting-lever, so that a short connecting-lever may be used and the balance-wheel vibrate in the bend or bow of said long lever-staff.

To enable others skilled in the art to make and use my invention, I will proceed to describe the same with reference to the drawing.

*a* represents the lever-staff, with its pivots *c c* opposite each other. *e* represents a lever, connected to said staff, and extending to, so as to be operated by the balance-wheel, or other part connected to or moved by the balance-wheel. On the opposite side of the pivots from where the lever projects is the crank, bow, or U-portion of the staff, so as to balance the lever *e* and thus relieve the balance-wheel of its weight, while it admits of the vibration of the balance-wheel on said bend or bow.

By this construction of lever-staff I am enabled to use a long lever-staff in connection with a short lever, and the balance-wheel can play or vibrate within the opening of said lever-staff, and the lever-staff may be of the same length as the balance-staff and be pivoted in the same plates or frames therewith. A lever with a long staff I prefer, as it operates with more steadiness than a lever with a short staff does.

The crank, bowed, or bent portion of the lever-staff is made to balance, or nearly so, the lever *e*, and it may be loaded or relieved until it balances said lever *e*.

Figure 3:

At Fig. 3 is shown the modification of the U or bow-form of lever-staff, and lever *e* made on, or as a part of it. It may, however, be of a bow-form, and the lever attached to it, as in Figs. 1 and 2, or otherwise, as preferred.

Having thus fully described my invention, what I claim is—

The lever-staff *a* or its equivalent, constructed to operate in connection with the lever *e* and with a balance-wheel arranged to vibrate in the bend of said lever-staff, thus giving more length to the lever-staff *a* without taking up any more space in the watch than is allotted to the ordinary shorter lever.

WILLIAM E. BANTA.

Witnesses:
   W. J. IRWIN,
   SALEM T. LAMB.